G. G. BERTRAM.
TIRE SANDING MACHINE.
APPLICATION FILED OCT. 13, 1911.
1,034,959.
Patented Aug. 6, 1912.
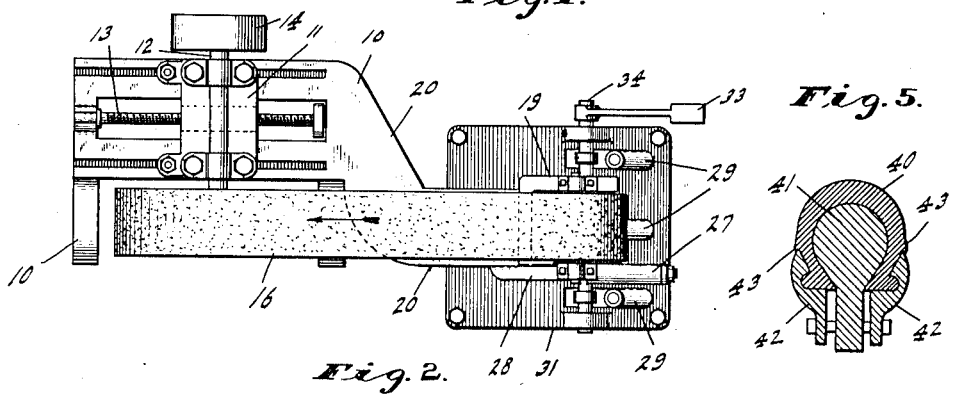
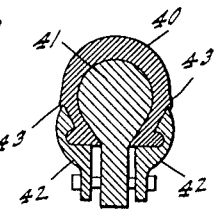
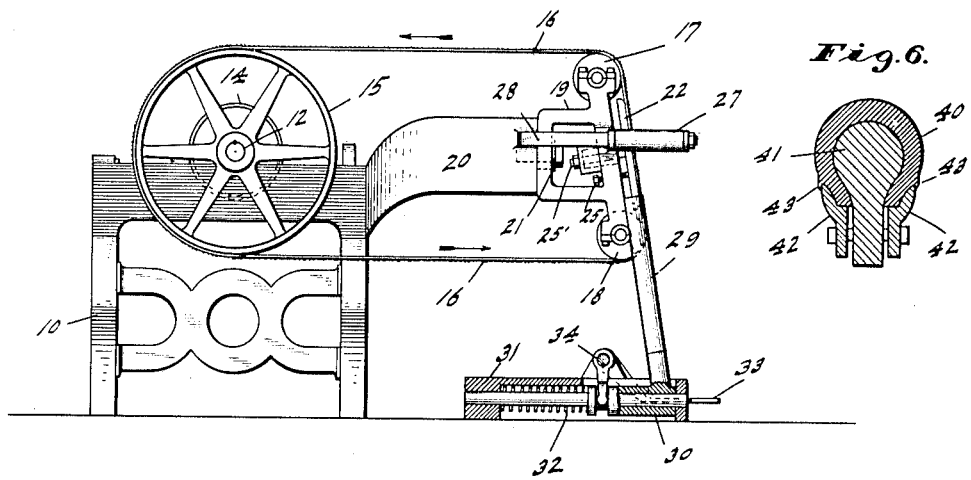
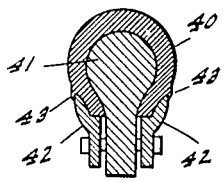
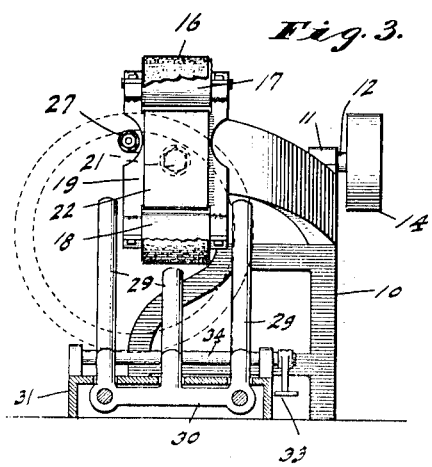
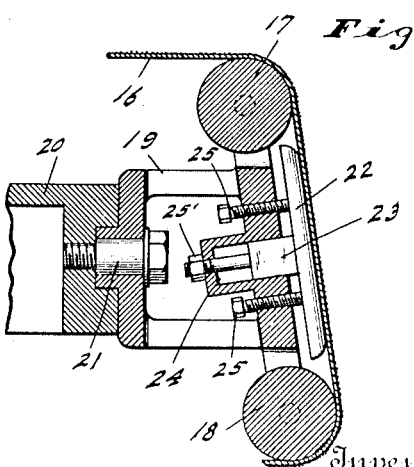
Witnesses
Frank A. Fahl
May Layden
Inventor
George G. Bertram,
by Arthur M. Hood
Attorney

UNITED STATES PATENT OFFICE.

GEORGE G. BERTRAM, OF INDIANAPOLIS, INDIANA.

TIRE-SANDING MACHINE.

1,034,959.

Specification of Letters Patent.

Patented Aug. 6, 1912.

Application filed October 13, 1911. Serial No. 654,478.

*To all whom it may concern:*

Be it known that I, GEORGE G. BERTRAM, a citizen of the United States, residing at Indianapolis, in the county of Marion and State of Indiana, have invented a new and useful Tire-Sanding Machine, of which the following is a specification.

In the manufacture of rubber tires, such as pneumatic tires, an unsightly ridge is formed on each side of the tire between the base and the tread thereof. These ridges, called the "overflow", are formed by the pressure between the cloth wrapping and the clamps, or "flanges" used in making the tire, which pressure forces part of the rubber over the edges of the clamps.

It is the object of my present invention to provide a machine for removing this overflow.

The various novel features of my invention will appear from the description and drawings and will be particularly pointed out in the claims.

In the drawings, Figure 1 is a plan view of a machine embodying my invention; Fig. 2 is a side elevation of such machine; Fig. 3 is a front elevation thereof; Fig. 4 is an enlarged section of the sanding head; and Figs. 5 and 6 are sectional views showing the overflow on two kinds of tires.

On the frame 10 is mounted a cross-head 11 carrying a shaft 12 and adjustable transversely to the shaft by a screw 13. Power is transmitted to the shaft 12 by a pulley 14 or its equivalent, and the shaft carries a pulley 15 carrying and driving a sanding belt 16. The sanding belt extends substantially horizontally from the top and bottom of the pulley 15 to two rollers 17 and 18 rotatably mounted in a sanding head 19, which is rotatably adjustable on an arm 20 extending from the frame 10. The parts 10 and 20 are conveniently fastened together by the bolt 21. The rollers 17 and 18 are so arranged that the portion of the sanding belt 16 between the two rollers 17 and 18 is inclined somewhat from the vertical. Behind this inclined portion of the sanding belt is a supporting plate 22, the face of which is parallel to said portion. The plate 22 is provided with a projection 23 mounted in a socket 24 in the sanding head 19, and is adjustable at right angles to its face by screws 25 and a nut 25'.

The tire 26 to be worked upon may be placed in the position shown in dotted lines in Fig. 3 where it hangs from a roller 27 mounted on a side arm 28 extending from the arm 20. The depending part of the tire may rest against posts or rollers 29 parallel to the face of the plate 20 and carried by a common support 30. This support is slidably mounted in a base 31 and is pressed forward, as by a spring 32, to bring the forward surfaces of the posts 29 substantially into the same plane with that part of the sanding belt 19 which is between the rollers 17 and 18. The frame 30 and posts 29 may be pushed backward, however, by a foot lever 33, which may conveniently be mounted on a pivot 34.

In the common method of forming tires, the material 40 of the tire is formed over a core 41, and the edges of the tire are clamped to the base by clamps or "flanges" 42. Then the tire is wrapped with a cloth wrapping, which forces part of the material of the tire over the edges of the clamps to form the overflow ridge 43. It is this ridge which is to be removed. In the clencher type of tire shown in Fig. 5, the overflow ridge 44 is usually well up toward the tread of the tire, and in sanding these tires to remove the overflow, the lower parts of the tire may be supported by the posts 29. In types of tires other than the clencher, as for instance that shown in Fig. 6, the overflow ridge is generally nearer the base of the tire. In sanding this type of tire, the foot lever 33 is depressed to move the posts 29 backward, allowing the lower part of the tire to be swung under the roller 18 so that the overflow ridge can be reached by the sanding belt 16.

My invention is not limited in its detail to the precise arrangement shown and described, and I aim to cover all modifications which do not involve a departure from the spirit and scope of my invention as set forth in the following claims.

What I claim as new is:

1. In a tire-sanding machine, the combination of a sanding belt, means for driving said belt, a pair of rollers over which said belt passes, said rollers being arranged so that the sanding belt passes between them in a plane somewhat inclined to the vertical, and a head carrying said rollers and rotatably adjustable on an axis at an angle to the axes of the rollers.

2. A tire-sanding machine, comprising a sanding belt, means for driving said belt, a pair of rollers over which said belt passes, a supporting plate for supporting the belt between said two rollers, and a head in which said rollers and said supporting plate are mounted, said head being rotatably adjustable about an axis at an angle to the axes of the rollers.

3. A tire-sanding machine, comprising a sanding belt, means for driving said belt, a pair of rollers over which said belt passes, a supporting plate for supporting the belt between said two rollers, and means for adjusting said plate transversely to a plane tangent to said two rollers.

4. A tire-sanding machine, comprising a sanding belt, means for driving said belt, a pair of rollers over which said belt passes, the rollers being so located that the part of the belt between the two rollers is inclined to the vertical, an arm upon which a tire may be hung in position to be acted upon by said inclined portion of the belt, and a frame for supporting the depending portion of said tire.

5. A tire-sanding machine, comprising a sanding belt, means for driving said belt, a pair of rollers over which said belt passes, the rollers being so located that the part of the belt between the two rollers is inclined to the vertical, an arm upon which a tire may be hung in position to be acted upon by said inclined portion of the belt, a frame for supporting the depending portion of said tire, and means for moving said frame out of supporting position.

6. In a tire-sanding machine, the combination of a sanding belt, means for driving said belt, a pair of rollers over which said belt passes, a plate for supporting said belt between said rollers, and an arm projecting at one side of the belt for extending through and supporting a tire in position to be acted upon by said supported part of the belt.

7. In a tire-sanding machine, the combination of a sanding belt, means for driving said belt, a pair of rollers over which said belt passes, and a head carrying said rollers and rotatably adjustable on an axis at an angle to the axes of the rollers.

In witness whereof, I have hereunto set my hand and seal at Indianapolis, Indiana, this tenth day of October, A. D. one thousand nine hundred and eleven.

GEORGE G. BERTRAM. [L. S.]

Witnesses:
    Frank A. Fahle,
    G. B. Schley.